D. E. RICE.
Feed Water Heater and Pump Combined.
No. 9,476. Reissued Nov. 23, 1880.
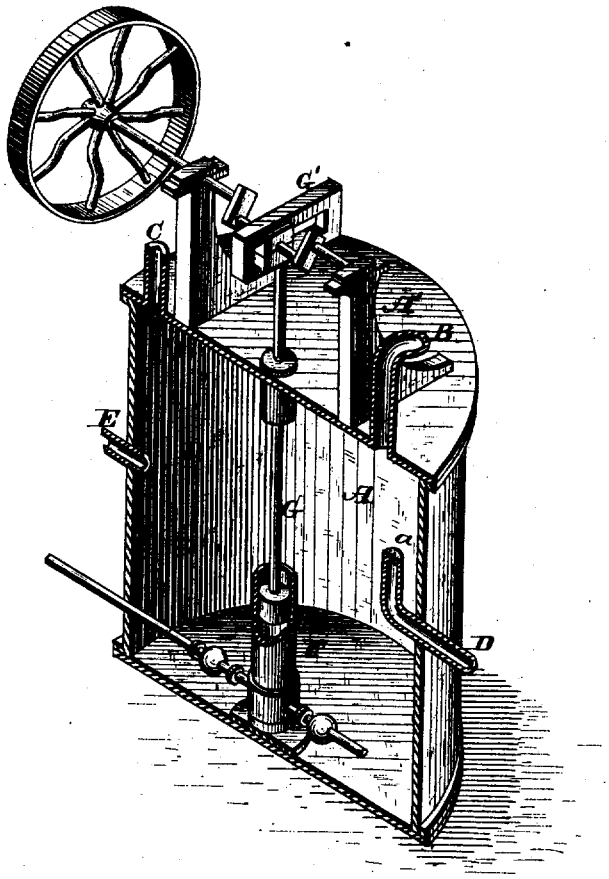
*Attest:*
Geo. H. Carlisle
Charles B. Lothrop
*Inventor:*
D. E. Rice
N. PETERS, PHOTO-LITHOGRAPHER, WASHINGTON, D. C.

UNITED STATES PATENT OFFICE.

DELOS E. RICE, OF DETROIT, MICHIGAN.

FEED-WATER HEATER AND PUMP COMBINED.

SPECIFICATION forming part of Reissued Letters Patent No. 9,476, dated November 23, 1880.

Original No. 193,617, dated July 31, 1877. Application for reissue filed October 16, 1880.

*To all whom it may concern:*

Be it known that I, DELOS E. RICE, of Detroit, in the county of Wayne and State of Michigan, have invented a new and useful Improvement in a Combined Feed-Pump and Heater, of which the following is a specification.

The object I have in view is to raise the temperature of the feed-water to the boiling-point by contact with and partial condensation of the exhaust-steam, and to deliver the feed-water at or near this elevated temperature to the boiler.

To this end my invention consists in the combination, construction, and arrangement of the several parts composing my heater, as more fully hereinafter set forth.

In the drawing, which is a sectional perspective view, A represents a cylindrical heater-tank, having a detachable head, *a*, and a man-hole in the side, through which access is had to the interior. B is the inlet for the exhaust-steam, and C is an escape-pipe, through which the uncondensed steam escapes. D is the feed-water-inlet pipe, with its inner part upturned and provided with a jet or perforated plate, *a*, at its extremity, which is directly under the steam-inlet. E is the overflow-pipe, through which the surplus water flows out of the tank. As the water is discharged from the pipe D in jets, these latter are met by and mingled with the exhaust-steam entering at B, which results in raising the temperature of the water and condensing the greater portion of the exhaust-steam, (in some cases condensing all,) and thus insures a supply of water at very near the boiling-point.

F is a plunger feed-pump placed at the bottom of the tank, so that it is partly submerged, thereby avoiding the difficulty and uncertainty of action heretofore experienced in attempting to pump very hot water. The plunger is attached to a rod, G, playing through a stuffing-box in the head *a*, and terminating in a slotted yoke, G′, reciprocated by a sliding block on a cranked shaft, which is slowly rotated from any convenient source of power.

The door or man-hole in the tank gives access therein for cleaning it out or examining the valves of the pump. By removing the head A all the working parts except the pump-valves come with it, and being permanently attached to the head there is no liability to get out of line.

What I claim as my invention, and desire to secure by Letters Patent, is—

1. The feed-water heater described, consisting of the cylindrical tank A, the submerged reciprocating pump F, exhaust-steam-inlet pipe B, feed-water-inlet pipe D, having its end covered by a jet or perforated plate, *a*, and in line with the said steam-inlet pipe, steam-escape C, and overflow E, all constructed, arranged, and combined substantially as described and shown.

2. The feed-water heater described, consisting of the tank A, submerged pump F, exhaust-steam-inlet pipe B, and feed-water-inlet pipe D, provided with a suitable jet or perforated plate, all constructed, arranged, and combined substantially as described and shown.

3. The feed-water heater described, consisting of the tank A, submerged reciprocating pump F, exhaust-steam-inlet pipe B, feed-water-inlet pipe D, having its end covered with a jet or perforated plate, *a*, and in line with the said steam-inlet pipe, and steam-escape C, all constructed, arranged, and combined substantially as described and shown.

4. The feed-water heater described, consisting of the tank A, submerged reciprocating pump F, exhaust-steam-inlet pipe B, and feed-water-inlet pipe D, in line with said exhaust-steam-inlet pipe, and overflow E, all constructed and arranged and combined substantially as described and shown.

D. E. RICE.

Witnesses:

GEO. H. CARLISLE,

CHARLES B. LOTHROP.